United States Patent
Duyck et al.

(10) Patent No.: US 6,533,043 B1
(45) Date of Patent: Mar. 18, 2003

(54) VERTICAL HOE

(76) Inventors: Joseph H. Duyck, 2330 NW. Schefflin Rd., Cornelius, OR (US) 97113; Debra A. Duyck, 2330 NW. Schefflin Rd., Cornelius, OR (US) 97113; Michael M. Duyck, 2330 NW. Schefflin Rd., Cornelius, OR (US) 97113

( * ) Notice: Subject to any disclaimer, the term of this patent is extended or adjusted under 35 U.S.C. 154(b) by 0 days.

(21) Appl. No.: 09/876,962

(22) Filed: Jun. 8, 2001

(51) Int. Cl.[7] .................................................. A01B 1/00
(52) U.S. Cl. ............................ 172/371; D8/11; 7/114; 30/171
(58) Field of Search ......................... 172/371, 380, 172/13; 16/110.1, 112.1; 7/114, 116; 15/236.02; D8/11; 294/19.1, 54.5, 49; 30/164.5, 164.8, 171, 172; 254/13.5; 37/285

(56) References Cited

U.S. PATENT DOCUMENTS

| | | | |
|---|---|---|---|
| 159,332 A | | 2/1875 | Johnson |
| 323,130 A | | 7/1885 | Ells |
| 465,763 A | * | 12/1891 | Hurst |
| D35,242 S | * | 10/1901 | Solomon |
| 843,501 A | | 2/1907 | Sparks |
| 1,281,167 A | * | 10/1918 | Jones |
| 1,545,228 A | | 7/1925 | Bartran |
| 1,749,674 A | * | 3/1930 | Roberson |
| 1,906,171 A | | 4/1933 | Mcneal |
| 1,931,349 A | * | 10/1933 | Habig |
| 2,011,062 A | * | 8/1935 | Masamitsu |
| D198,464 S | | 6/1964 | Langlie et al. |
| 3,154,336 A | * | 10/1964 | Nelson |
| 3,326,299 A | | 6/1967 | Foo |
| 3,680,641 A | * | 8/1972 | Hein |
| 3,847,226 A | * | 11/1974 | Long |
| 3,942,591 A | * | 3/1976 | Brannin |
| 4,286,893 A | * | 9/1981 | Pomares |
| 4,890,679 A | | 1/1990 | Jacobs |
| 5,040,614 A | * | 8/1991 | Nash |
| 5,165,144 A | * | 11/1992 | Nisenbaum |
| 5,461,849 A | * | 10/1995 | Allen |
| 5,848,653 A | * | 12/1998 | Warter |
| 5,947,039 A | * | 9/1999 | Lundgren et al. |

FOREIGN PATENT DOCUMENTS

| | | | |
|---|---|---|---|
| DK | 48860 | * | 6/1934 |
| GB | 125245 | * | 4/1919 |
| GB | 158138 | * | 2/1921 |

* cited by examiner

*Primary Examiner*—Victor Batson

(57) ABSTRACT

A vertical hoe for removing unwanted plants from the ground with less effort than conventional tools. The vertical hoe includes a handle portion for the user to grasp onto and a blade portion for the removal of unwanted plants.

1 Claim, 1 Drawing Sheet

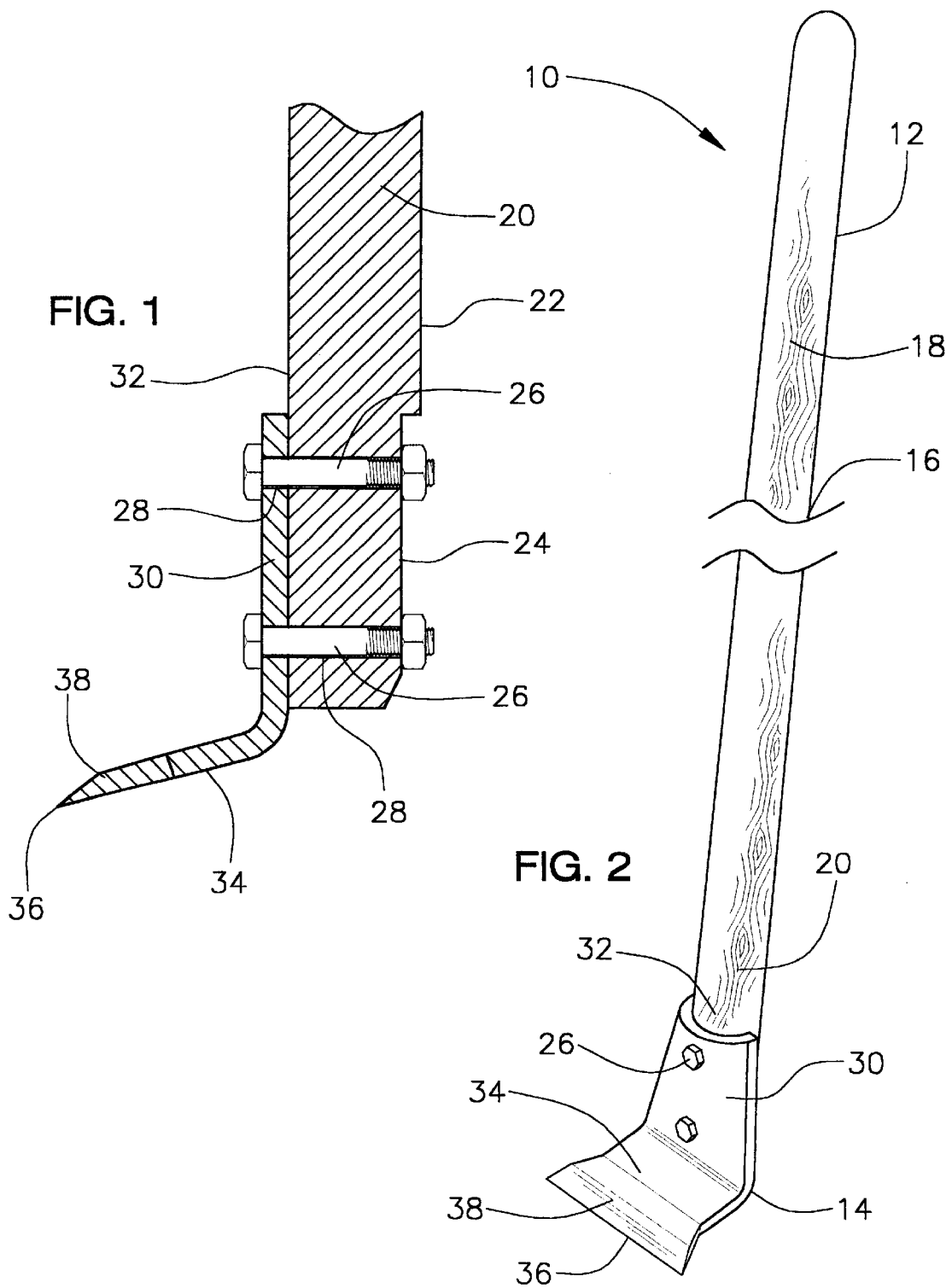

VERTICAL HOE

BACKGROUND OF THE INVENTION

1. Field of the Invention

The present invention relates to vertical hoes and more particularly pertains to a new vertical hoe for removing unwanted plants from the ground with less effort than conventional tools.

2. Description of the Prior Art

The use of vertical hoes is known in the prior art. More specifically, vertical hoes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 159,332; 323,130; U.S. Pat. No. Des. 198,464; U.S. Pat. Nos. 843,501; 1,545,228; 4,890,679; and 1,906,171.

While these devices fulfill their respective, particular objectives and requirements, the aforementioned patents do not disclose a new vertical hoe. The inventive device includes a handle portion for the user to grasp onto and a blade portion for the removal of unwanted plants.

In these respects, the vertical hoe according to the present invention substantially departs from the conventional concepts and designs of the prior art, and in so doing provides an apparatus primarily developed for the purpose of removing unwanted plants from the ground with less effort than conventional tools.

SUMMARY OF THE INVENTION

In view of the foregoing disadvantages inherent in the known types of vertical hoes now present in the prior art, the present invention provides a new vertical hoe construction wherein the same can be utilized for removing unwanted plants from the ground with less effort than conventional tools.

The general purpose of the present invention, which will be described subsequently in greater detail, is to provide a new vertical hoe apparatus and method which has many of the advantages of the vertical hoes mentioned heretofore and many novel features that result in a new vertical hoe which is not anticipated, rendered obvious, suggested, or even implied by any of the prior art vertical hoes, either alone or in any combination thereof.

To attain this, the present invention generally comprises a handle portion for the user to grasp onto and a blade portion for the removal of unwanted plants.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vertical hoe apparatus and method which has many of the advantages of the vertical hoes mentioned heretofore and many novel features that result in a new vertical hoe which is not anticipated, rendered obvious, suggested, or even implied by any of the prior art vertical hoes, either alone or in any combination thereof.

It is another object of the present invention to provide a new vertical hoe which may be easily and efficiently manufactured and marketed.

It is a further object of the present invention to provide a new vertical hoe which is of a durable and reliable construction.

An even further object of the present invention is to provide a new vertical hoe which is susceptible of a low cost of manufacture with regard to both materials and labor, and which accordingly is then susceptible of low prices of sale to the consuming public, thereby making such vertical hoe economically available to the buying public.

Still yet another object of the present invention is to provide a new vertical hoe which provides in the apparatuses and methods of the prior art some of the advantages thereof, while simultaneously overcoming some of the disadvantages normally associated therewith.

Still another object of the present invention is to provide a new vertical hoe for removing unwanted plants from the ground with less effort than conventional tools.

Yet another object of the present invention is to provide a new vertical hoe which includes a handle portion for the user to grasp onto and a blade portion for the removal of unwanted plants.

Still yet another object of the present invention is to provide a new vertical hoe that is designed to more efficiently remove weeds and the like with less ease than conventional hoes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic cross-sectional side view of a new vertical hoe according to the present invention.

FIG. 2 is a schematic perspective view of the present invention.

DESCRIPTION OF THE PREFERRED EMBODIMENT

With reference now to the drawings, and in particular to FIGS. 1 and 2, a new vertical hoe embodying the principles and concepts of the present invention and generally designated by the reference numeral 10 will be described.

As best illustrated in FIGS. 1 and 2, the vertical hoe 10 generally comprises a handle portion 12 is designed for the user to grasp onto the vertical hoe.

A blade portion 14 is designed for the removal of weeds and other difficult, unwanted plants from a ground surface.

The handle portion 12 comprises an elongate member 16. The elongate member 16 includes a substantially circular cross-section such that the handle portion 12 is designed for being comfortable to grip by the user.

The handle portion 12 includes a top and bottom section 18, 20. The top section 18 is for grasping onto by the user. The bottom section 20 is designed for coupling to the blade portion 14.

The bottom section 20 of the handle portion 12 includes a rear face 22. The rear face 22 is substantially flat such that the rear face 22 provides a flat surface 24 for a plurality of mounting bolts 26 to abut.

The bottom section 20 including a plurality of bores 28. The bores 28 are for receiving the plurality of mounting bolts 26 for coupling the handle portion 12 to the blade portion 14.

The blade portion 14 includes an upper end 30. The upper end 30 is designed for receiving a front face 32 of the bottom section 20 of the handle portion 12.

The upper end 30 includes a plurality of bores 28 such that the plurality of bores 28 are for receiving a plurality of mounting bolts 26. The mounting bolts 26 are for coupling the blade portion 14 to the handle portion 12.

The blade portion 14 includes a lower end 34. The lower end 34 is angularly displaced from the upper end 30 of the blade portion 14 such that the lower end 34 angles substantially,outward from the front face 32 of the handle portion 12.

The lower end 34 of the blade portion 14 includes a blade edge. The blade edge is located at a distal end 38 of the lower end 34 of the blade portion 14 for being inserted into the ground surface such that the blade edge cuts the weed allowing the removal of the weed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A vertical hoe for the removal of unwanted plants, the vertical hoe comprising:

a handle portion, said handle portion being adapted for grasping by a user;

a blade portion coupled to said handle portion;

said handle portion comprising an elongate member, said elongate member having a substantially circular cross-section such that said handle portion is adapted for being comfortable to grip by the user;

said handle portion having a top and bottom section, said top section being for grasping onto by the user;

said bottom section of said handle portion having a rear face, said rear face being substantially flat such that said rear face provides a flat surface for a plurality of mounting bolts to abut;

said bottom section including a plurality of bores, said bores being for receiving said plurality of mounting bolts for coupling said handle portion to said blade portion;

said blade portion having an upper end, said upper end being arcuate such that said upper end is adapted for receiving a curved front face of said bottom section of said handle portion;

said upper end having a plurality of bores such that said plurality of bores being for receiving said plurality of mounting bolts for coupling said blade portion to said handle portion;

said blade portion having a lower end, said lower end being angularly displaced from said upper end of said blade portion such that said lower end angles substantially outward from said front face of said handle portion;

said lower end of said blade portion including a blade edge, said blade edge being located at a distal end of said lower end of said blade portion for being inserted into the ground surface for cutting plants to be removed; and said lower end of said blade having an upper blade section and a lower blade section, said upper blade section having substantially parallel outer sides such that said upper blade section is substantially rectangular, said lower blade section having flared outer sides such that a lower blade section is substantially trapezoidal-shaped.

* * * * *